UNITED STATES PATENT OFFICE.

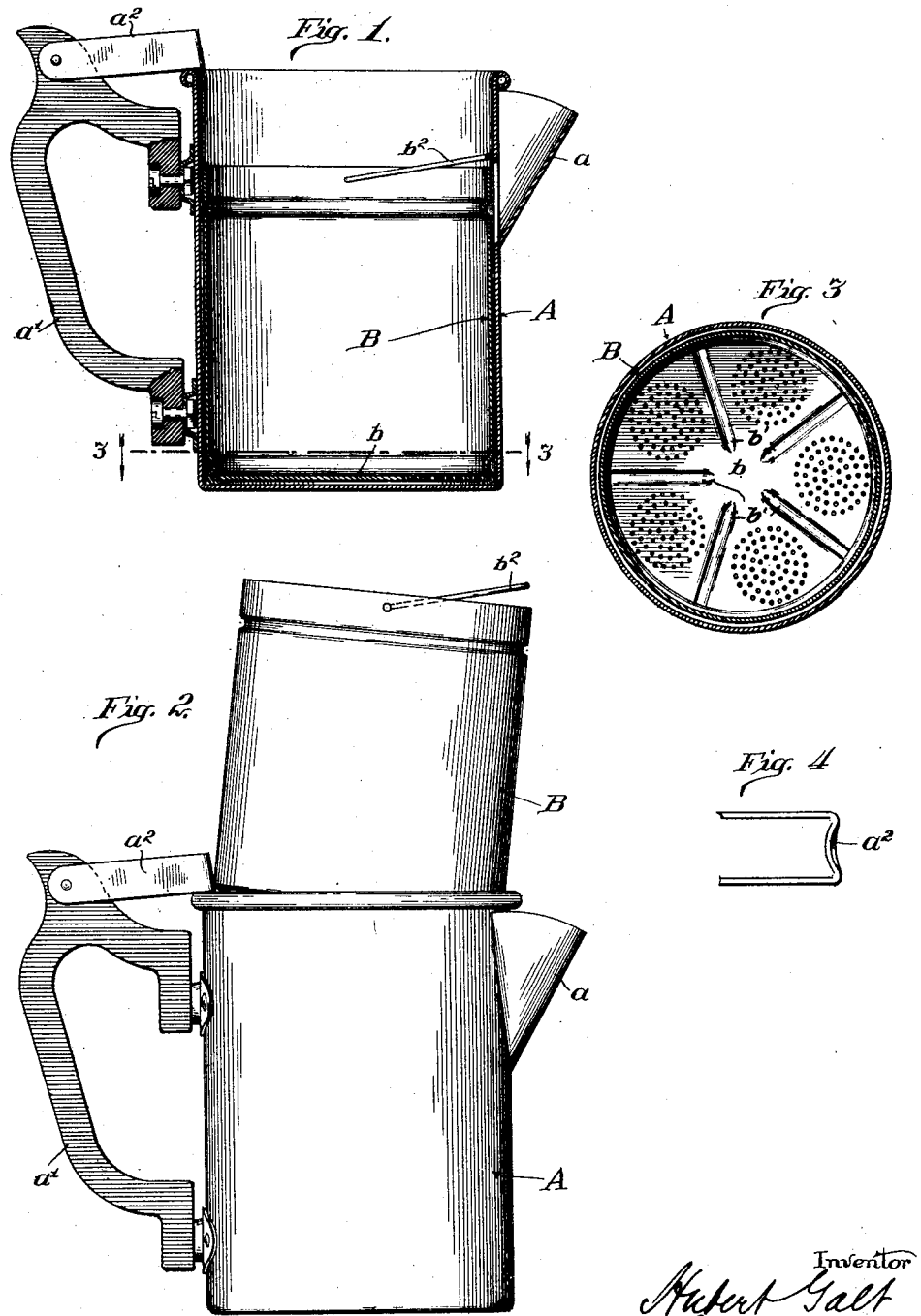

HUBERT GALT, OF LAKE FOREST, ILLINOIS.

DEVICE FOR MAKING COFFEE, TEA, OR SIMILAR BEVERAGES.

1,400,214.  Specification of Letters Patent.  Patented Dec. 13, 1921.

Application filed December 29, 1919. Serial No. 347,957.

*To all whom it may concern:*

Be it known that I, HUBERT GALT, residing at Lake Forest, in the county of Lake, State of Illinois, having invented certain new and useful Improvements in Devices for Making Coffee, Tea, or Similar Beverages, do hereby declare that the following is a full, clear, and exact description of the same.

My invention relates to pots for making coffee, etc., and its object is to provide a device having an outer vessel and an inner removable container having an imperforate body of approximately the capacity of the outer vessel and having a screen at its lower end near the bottom of the outer vessel when the container is in its lower position therein and upon which the cooked coffee grounds will settle after the beverage is made to provide a strainer or filter through which the beverage will pass to clear when the container is raised in the outer vessel.

The invention consists in the matter hereinafter described and then pointed out in the appended claim.

In the accompanying drawing Figure 1 is a central vertical sectional view of a pot embodying my invention with the parts in position for making coffee;

Fig. 2 is a side view with the inner container in raised position in the outer vessel;

Fig. 3 is a sectional view on the line 3—3 of Fig. 1, and

Fig. 4 is a detail view of the latch to hold the container in filtering position in the outer vessel.

In the drawings the reference letter A indicates the outer vessel of a pot for making coffee, and having a removable cover (not shown) for its top, a suitable spout $a$ and a handle $a'$, the vessel being one of the commonly known forms for making such beverage.

The letter B represents an inner removable container whose external diameter is slightly smaller than the internal diameter of the outer vessel, so that the former fits removably within the latter and provides an open circulating space between them. The body or shell of the container B is solid or imperforate, being open at its top and closed at its bottom by a screen or sieve $b$ which is provided with fine perforations and is above the lower end of the body. The container is provided with ribs $b'$ at its lower end to provide circulating space, and at its upper end with a flexible or pivoted handle $b^2$, which may be conveniently turned down out of the way to permit the cover of the outer vessel to be placed in position thereon.

The outer vessel and container may be of any suitable shape and capacity, and they are so related that the screen or sieve of the container rests slightly above the bottom of the outer vessel when the parts are assembled for steeping and the capacity of the container is substantially the same as that of the outer vessel, it being large enough to hold sufficient water to make a sufficient number of cupfuls of beverage to substantially fill the latter when the container is removed so that the beverage will be made in the container when the parts are assembled for steeping the coffee and will be filtered through the spent grounds when the container is held in its suspended position in the outer vessel.

In using the device the desired charge of ground coffee is placed on the screen either before or after the container is assembled in the outer vessel, the two parts are assembled as in Fig. 1, the necessary amount of water is poured into the container, and the cover is put on the outer vessel. If boiled coffee is desired cold water is used and the pot is then set on a stove or over a fire to boil the water to steep the coffee; if drip coffee is desired it is only necessary to add boiling water to the charge of coffee, and the pot need not be set on the stove or fire as the beverage is steeped by the boiling water. The water fills the container more or less, according to the number of cups of beverage to be made, and also fills the space between the container and outer vessel to the same level. In making boiled coffee when the water boils it passes down through the screen and up through this intermediate open circulating space and over the top of the container, back into it without boiling out of the pot, so that it circulates through the coffee in the container to bring all the water into contact with the entire body of the coffee; in other words, every particle of the ground coffee is subjected to the boiling action of the entire body of the water. In making drip coffee the same effect and result is produced as the charge of water is poured onto the charge of coffee and as the small screen at the bottom prevents the water from passing through it rapidly into the space below the screen, it brings practically the entire body of the water into boiling contact with every particle of the ground coffee. In the case of either boiled or drip coffee, after the beverage is steeped the spent or cooked grounds settle on the screen to form a filter, and when the container is raised in the outer vessel all the beverage filters through the spent grounds. When the full capacity is utilized the container is raised as in Fig. 2 with its screen bottom located in the open upper end of the outer vessel. The container is held in any elevated position by any suitable means, preferable by the retaining latch $a^2$ which is pivoted on the handle of the outer vessel and wedges against the side of the container, until the beverage in it filters through the spent grounds on the screen. This filtering of the beverage clears it as it removes all cloudiness and turbidity.

By this invention either boiled or drip coffee may be made in the same pot, either may be in any quantity from one cup to the capacity of the pot In either case all the water is brought into boiling contact with the coffee and every particle of the coffee is subjected to its boiling action, so that the beverage made in the container by a single charge of water in either case cooks the strength out of the entire charge of ground coffee. The beverage in the container filters through the cooked grounds and is cleared when the container is raised in the outer vessel, and as the thin film of beverage in the space between the body of the container and the outer vessel forms an air seal it follows that when the screen in raised the partial vacuum below it tends to suck the beverage through the coffee grounds on the screen with considerable force to draw the entire strength out of the grounds. Also, as the inner container opens at its top into the outer vessel, the boiling water passing up through the intermediate circulating space between them will flow back into the container, instead of boiling out of the pot. As the boiling water will rise in this passage sufficiently to pass back into the container even when the pot is only partially filled with water, this result is important in all boiling operations of the device.

I claim:—

A pot for making coffee comprising an outer vessel, provided with a fluid outlet near its top, an inner removable container having an imperforate open-end shell of slightly less length than the outer vessel and sufficiently smaller in external diameter than the internal diameter of the outer vessel to form an intermediate circulating space through which the boiling water may rise from the lower portion of the outer vessel and pass into the upper part of the container without overflowing the pot, and a screen at the lower end of the container forming the support for the coffee-grounds and spaced slightly above the bottom of the outer vessel when the container is in its lower position in the vessel, the parts being constructed so that when the container is down in said position the boiling action of the body of water causes the water to flow from the lower portion of the vessel up through the intermediate circulating space and pass into the container without boiling out of the pot and brings the entire body of water into boiling contact with the charge of coffee in the container, and after the coffee is made the cooked grounds settle on the screen and form a filter at the bottom of the pot through which the beverage is strained when the container is raised.

In testimony whereof I affix my signature in the presence of two witnesses.

HUBERT GALT.

Witnesses:
J. McRoberts,
Harry S. Harned.